No. 876,239. PATENTED JAN. 7, 1908.
H. S. ROLLINS.
REFUSE SEPARATOR FOR BEETS.
APPLICATION FILED JULY 21, 1906.
3 SHEETS—SHEET 1.
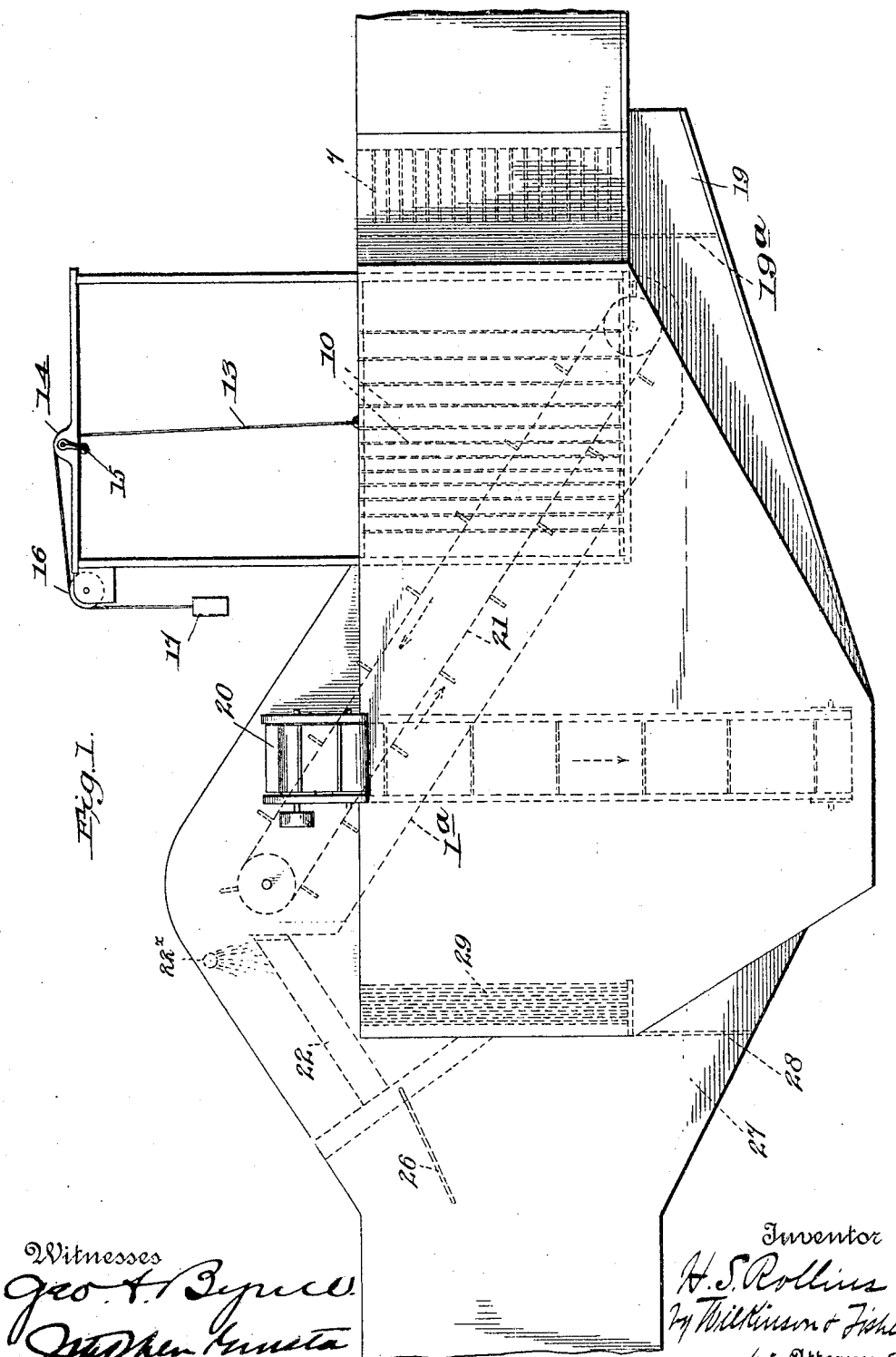

No. 876,239. PATENTED JAN. 7, 1908.
H. S. ROLLINS.
REFUSE SEPARATOR FOR BEETS.
APPLICATION FILED JULY 21, 1906.
3 SHEETS—SHEET 2.
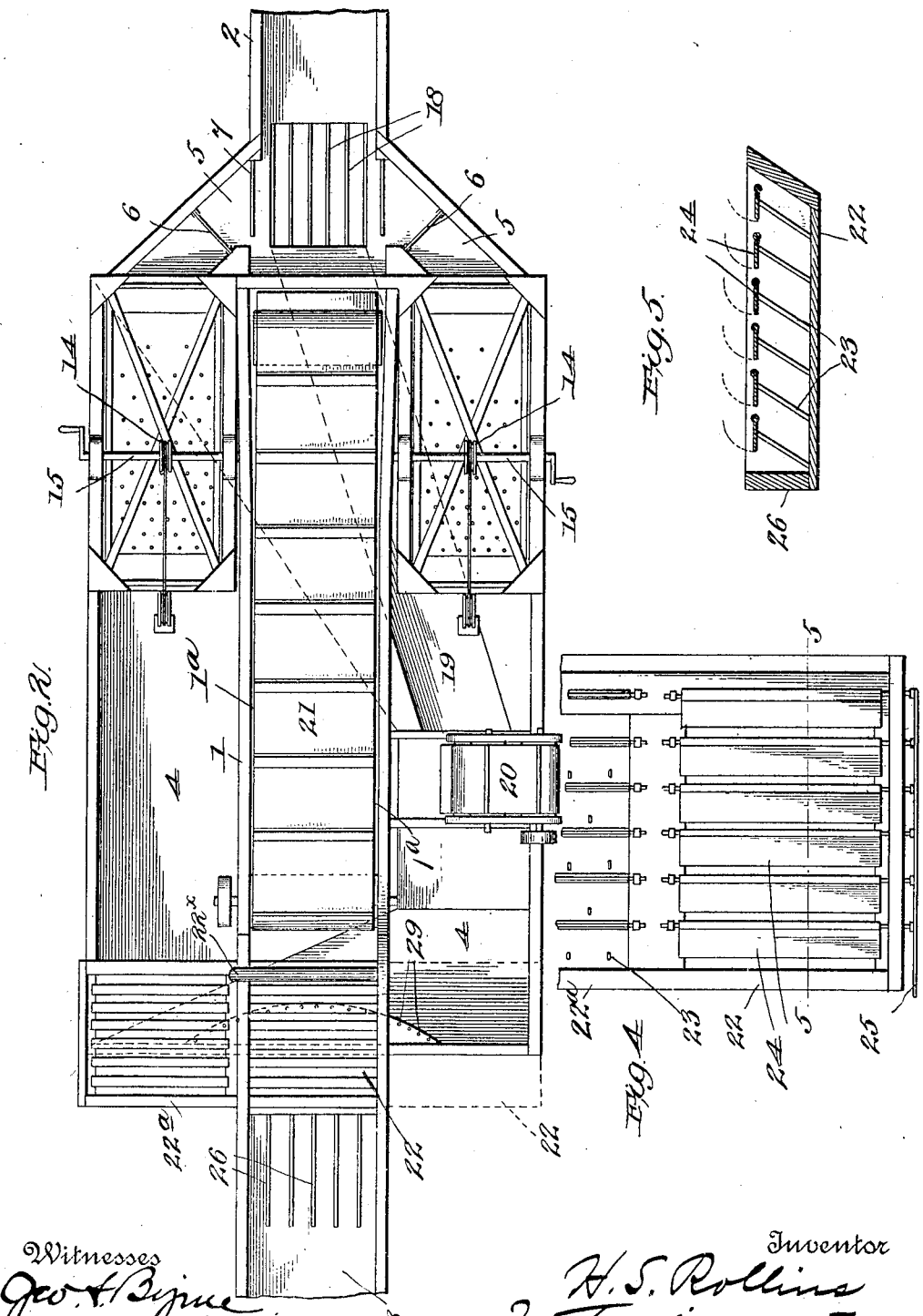

No. 876,239. PATENTED JAN. 7, 1908.
H. S. ROLLINS.
REFUSE SEPARATOR FOR BEETS.
APPLICATION FILED JULY 21, 1906.
3 SHEETS—SHEET 3.
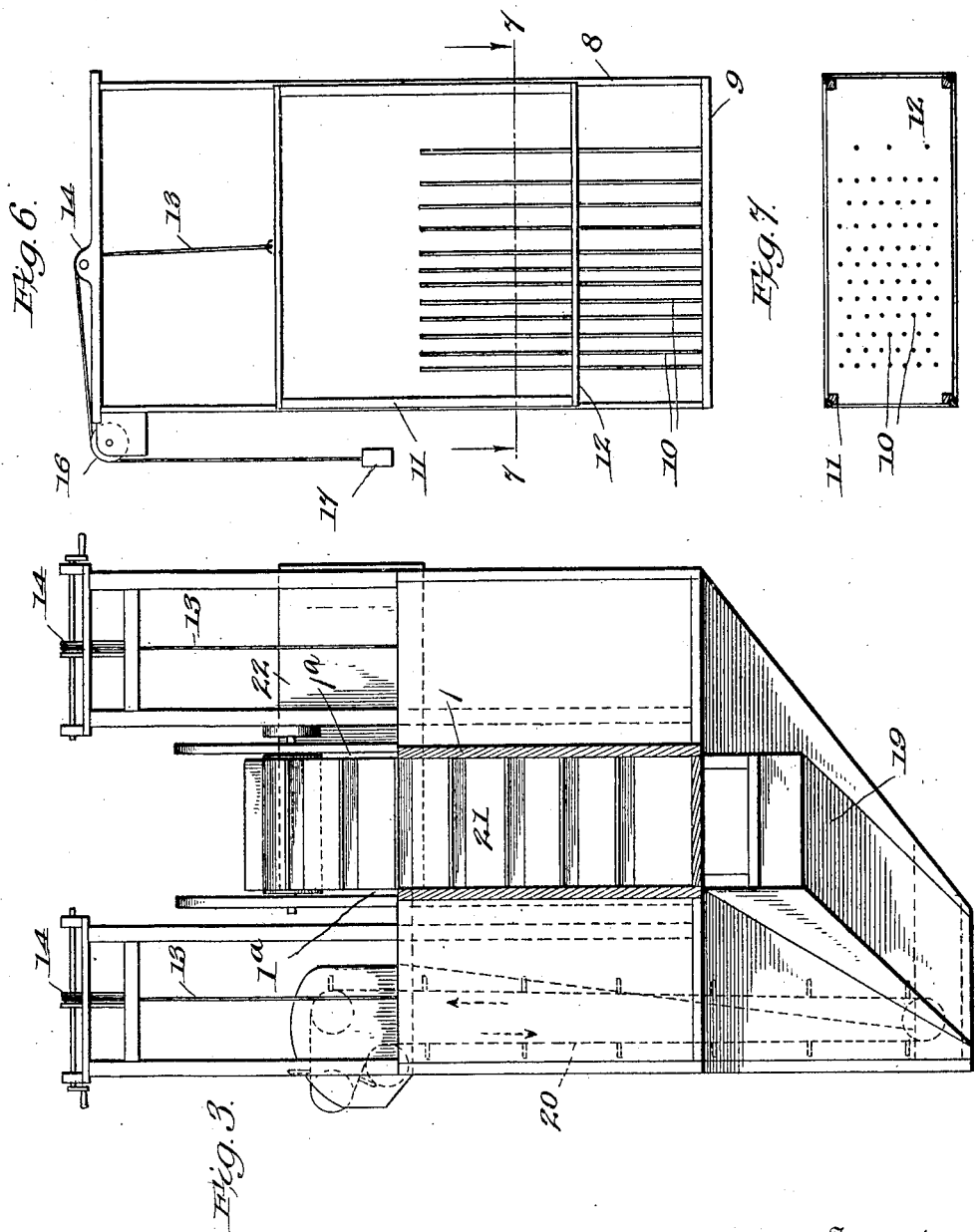
Witnesses
Inventor
H. S. Rollins
By Wilkinson & Fisher
his Attorneys

UNITED STATES PATENT OFFICE.

HARRISON S. ROLLINS, OF STERLING, COLORADO.

REFUSE-SEPARATOR FOR BEETS.

No. 876,239.  Specification of Letters Patent.  Patented Jan. 7, 1908.

Application filed July 21, 1906. Serial No. 327,186.

*To all whom it may concern:*

Be it known that I, HARRISON S. ROLLINS, a citizen of the United States, residing at Sterling, in the county of Logan and State of Colorado, have invented certain new and useful Improvements in Refuse-Separators for Beets; and I do hereby declare the following to be a full, clear, and exact description of the invention, such as will enable others skilled in the art to which it appertains to make and use the same.

This invention relates to improvements in apparatus for separating from beets refuse matter, such as weeds, beet leaves, stones, etc., and particularly in the class of apparatus wherein the beets are flumed into the factory.

Briefly speaking the invention consists in providing a main trough having inlet and outlet flumes with auxiliary troughs communicating with said inlet flume and said main or central trough, said inlet flume being provided with a stone trap and said auxiliary troughs being provided with weed traps co-operating to catch the weeds, and the term "weeds" is intended to cover also beet leaves and analogous matter.

While I do not restrict myself to the exact details disclosed in the drawings and following specification, still for the purpose of more clearly understanding the invention, reference is had to the accompanying drawings illustrating a practical embodiment of same in which like letters designate the same parts in the several views, and in which:—

Figure 1 is a view in side elevation of my improved apparatus. Fig. 2 is a plan view of same. Fig. 3 is a view in end elevation looking from the front or inlet end. Fig. 4 is a fragmentary plan view of a second weed or leaf trap at the rear end of the apparatus, the hinged flaps being shown in plan view on one side and on the other side being shown elevated in edge view for cleaning out the weeds caught in the trap. Fig. 5 is a vertical sectional view on the line 5—5 of Fig. 4. Fig. 6 is a detail view of one of the forward weed traps, showing the sliding member partially elevated, and Fig. 7 is a sectional view on the line 7—7 of Fig. 6.

1 designates a main or central trough provided with the inlet flume 2 and the outlet flume 3, and comprising a casing having the inclined cross or laterally disposed partition $1^a$ separating said main casing or trough into a forward and a rear compartment, auxiliary troughs lying adjacent said main trough, communicating at their rear ends, through suitable openings not shown, with said main trough behind said partition $1^a$, and at their forward ends communicating with said inlet flume through the passage-ways 5, which passage-ways are provided with suitable sliding gates 6.

7 designates a vertical row of rearwardly projecting pins extending substantially across the opening between said passage ways and inlet flume and being spaced apart sufficiently to allow weeds, and leaves, and similar floating matter to pass therethrough but too close together to allow the passage of the floating beets. It will be observed that while the pins 7 extend substantially across the opening between the passage-ways 5 and the inlet flume, still it is important that the pins do not extend entirely across said openings, inasmuch as when in operation, as hereinafter described, the beet leaves and beets are floated through the flume 2, any leaves which may adhere to the pins 7 by wrapping therearound or otherwise will be forced by the water to the end of the pin and when reaching the end will be forced laterally into the passage-way 5.

In each of the auxiliary troughs adjacent the passage-ways 5 is located a weed trap which (referring particularly to Fig. 6) consists of a frame 8 having a solid base 9 in which is rigidly affixed a plurality of vertical rods 10 extending transversely of said frame and of said auxiliary troughs.

11 designates a sliding member or cage provided with a base-board 12 perforated to freely receive the vertical pins 10, and this sliding member may be balanced by a cable 13 reeving around a pulley 14 on a crank operated shaft 15, the other end of said cord reeving over a suitably mounted pulley 16 and being provided with a balancing weight 17.

18 designates a trap for stone or other heavy deposits and consists of a plurality of slots cut in the bottom of the inlet flume 2 adjacent the entrance to the main trough and the passage-ways 5, which trap communicates with an inclined trough 19 extending downwardly and sidewise from said stone trap, beneath said main trough, to a suitably driven stone elevator 20, the lower end of which may be disposed in one of said auxiliary troughs 4 and the upper end of which may be arranged to discharge outside of the apparatus. This trough or passageway 19 is provided with a suitable sliding gate 19ª.

21 designates a suitably driven beet elevator located within the forward compartment of said casing or main trough and extending upwardly from the forward end thereof to the rear of the apparatus and discharging onto the auxiliary weed trap at the rear of the apparatus. This auxiliary weed trap is primarily designed to catch any leaves or particles that may still adhere to the beets, and as particularly shown in Figs. 4 and 5, consists of a pan 22 provided with a plurality of pins 23, the upper portion of the pan being provided with hinged slats 24 spaced apart and preferably having a link and lever connection 25 for swinging them around to a vertical position to clean out the trap.

As seen in Fig. 5, the rear end of this pan is closed as at 26, and the pan preferably comprises two compartments, one of which may be disposed in operative position with the slats lying flat, while the other one is withdrawn in a position to clean out the leaves caught therein.

In Fig. 2 the section 22 of the pan is shown in operative position in full lines and in its withdrawn position in dotted lines, while the section 22ª is shown in its withdrawn position in full lines. This pan may be mounted in any suitable manner so as to slide transversely of the apparatus and when in position inclines downwardly and rearwardly, as clearly shown in dotted lines in Fig. 1. At the discharge end of this auxiliary weed trap there may be located an auxiliary stone trap consisting of the rearwardly inclining spaced pins 26 beneath which is located a pocket 27 at the inner end of the outlet flume which may be controlled by any suitable gate 28 (Fig. 1) opening communication with the stone elevator.

29 are a plurality of vertically mounted spaced rods preferably disposed in an arc transversely of the outlet flume beneath the auxiliary weed trap, which rods will tend to screen the outlet flume from weeds which may have escaped through the main weed traps.

In operation, the beets from the field are dumped into inlet flume 2 and are floated to the lower end of the beet elevator 21, and any heavy particles such as stone or similar substances will drop through into the stone trap 18 while floating leaves and weeds will pass into the passage-ways 5 and be caught within the weed trap. It will be observed that the passage of floating leaves into the passage-ways 5 will be facilitated by the backing of the water from the partition 1ª. In other words, the water coming from the inlet flume striking the partition 1ª will be backed with more or less of a swirling action so that as the beets are being elevated, the leaves will be washed around into the passageway. While one of these weed traps is operating, the gate 6 of the opposite trap may be closed, and when the operating trap is filled up, said gate of the opposite one may be opened when the sliding cage of the filled up trap may be elevated and the caught weeds raked out. In the meantime the stones and heavier particles are caught in the trap 18 and when the gate 19ª is opened are conveyed through the passage-way 19 to the stone elevator 20, and the beets are conveyed by the beet elevator 21 to the auxiliary weed trap 22, and while they are sliding over the spaced slats 24, a spray of water thereon from any suitable source (by way of illustration shown in the drawings as a perforated pipe 22ˣ) will wash off any clinging leaves, and the leaves passing between the spaces of said slats will drop into the pan 22 or 22ª and be caught by the spaced pins 23 and may be removed from time to time, bringing the opposite pan into operative position. The spaced pins 23 may be inclined, as illustrated, and may be of such a length as to allow the slats to rest on the top thereof for supporting the latter, or the slats may be held in position by having their lateral edges resting on the support to which they are hinged, as indicated in Fig. 4. Should any heavy particles, such as stone or other deposits be carried past the trap 18, they would be conveyed by the beet elevator 21 with the beets, but would either drop through the auxiliary slats 24 into the pan or weed traps 22 or through the stone trap 26 and into the pocket 28, while the beets would slide over the stone trap 26 and into the outlet flume leading to the factory.

Having thus described the invention what I claim is:—

1. In a refuse separator for beets, the combination with a beet conveying flume being adapted to contain flowing water, of means for catching non-floating deposits comprising a trap located in said flume, means for catching and retaining the floating refuse matter, comprising a trap located outside of said flume but in communication therewith, and means for elevating the separated beets, substantially as described.

2. In a refuse separator for beets, the combination of a flume adapted to transport beets through the main channel thereof, a weed trap located to one side of the said main channel, and thereby adapted to permit said beets to pass along the flume while stopping weeds and floating refuse matter brought thereto, and means diverting the passage of water from said flume to said weed trap to convey said floating refuse to the same, substantially as described.

3. In a refuse separator for beets, the combination with a main trough provided with inlet and outlet flumes and adapted to transport beets, of an auxiliary trough located to one side of and in communication with said main trough and inlet flume, a weed trap in said auxiliary trough comprising means for catching and retaining floating refuse matter while permitting said beets to pass, and means diverting laterally the passage of water to said auxiliary trough to convey the floating refuse matter to said weed trap, substantially as described.

4. In a refuse separator for beets, the combination with a main trough provided with inlet and outlet flumes, of an auxiliary trough disposed alongside of and in communication with said main trough and inlet flume, a beet elevator in said main trough, located between the positions of communication of said auxiliary trough with said main trough and inlet flume, and a weed trap in said auxiliary trough and comprising means for catching and retaining floating refuse matter, substantially as described.

5. In a refuse separator for beets, the combination with a main trough provided with inlet and outlet flumes, an auxiliary trough in communication with said main trough and inlet flume, a weed trap in said auxiliary trough to one side of said main trough, comprising a plurality of vertically disposed rods extending substantially across said auxiliary trough, and means for diverting the passage of water to convey the weeds or other floating refuse to said weed trap, substantially as described.

6. In a refuse separator for beets, the combination with a main trough provided with inlet and outlet flumes, of an auxiliary trough in communication with said main trough and inlet flume, a weed trap in said auxiliary trough, comprising a plurality of vertically disposed rods extending transversely of said auxiliary trough, a sliding cage having a perforated base to receive said vertical rods, and means for diverting the passage of water to convey the weeds to said weed trap, substantially as described.

7. In a refuse separator for beets, the combination with a trough provided with inlet and outlet flumes, adapted to transport beets, of a stone elevator, and a trap disposed in said inlet flume for catching heavy deposits, said trap communicating with an inclining passage-way extending to said stone elevator, a weed trap located alongside of said main trough and communicating with said inlet flume, and a beet elevator in said main trough communicating with said inlet flume, substantially as described.

8. In a refuse separator for beets, the combination with a main trough provided with inlet and outlet flumes, of an auxiliary trough communicating with said inlet flume through a passage-way, a vertical series of longitudinally disposed pins extending substantially across the opening between said inlet flume and passage-way, and a weed trap located in said auxiliary trough, substantially as described.

9. In a refuse separator for beets, the combination with a main trough provided with inlet and outlet flumes, of an auxiliary trough communicating with said main trough and inlet flume, a weed trap in said auxiliary trough, a beet elevator in said main trough extending upwardly and rearwardly, and an auxiliary weed trap located adjacent said beet elevator and adapted to receive the discharge therefrom, substantially as described.

10. In a refuse separator for beets, the combination with a main trough provided with inlet and outlet flumes, of an auxiliary trough communicating with said main trough and inlet flume, a weed trap in said auxiliary trough, a beet elevator in said main trough extending upwardly and rearwardly, and an auxiliary weed trap located adjacent said beet elevator and adapted to receive the discharge therefrom, comprising a pan provided with a plurality of pins and a plurality of hinged spaced slats, substantially as described.

11. In a refuse separator for beets, the combination with a main trough provided with inlet and outlet flumes, of auxiliary troughs, located adjacent said main trough, and communicating therewith and with said inlet flume, a weed trap in each of said auxiliary troughs comprising means for entrapping floating refuse matter, means controlling the inlet to each of said auxilliary troughs, and a beet elevator in said main trough, substantially as described.

12. In a refuse separator for beets, the combination with a main trough and an inlet and outlet flume communicating therewith, of a weed trap connected by a passage-way with said inlet flume, means for preventing the admission of beets to said passage-way, means for diverting the passage of water from said inlet flume to said passage-way for conveying floating refuse matter thereto, comprising a cross partition in said main trough, and a beet conveyer, substantially as described.

In testimony whereof, I affix my signature, in presence of two witnesses.

HARRISON S. ROLLINS.

Witnesses:
W. L. LAWSON,
G. M. DRUMMOND.